Nov. 3, 1953 — R. MIOLLIS — 2,657,994
CHEESE MAKING METHOD
Original Filed March 19, 1949 — 3 Sheets-Sheet 1
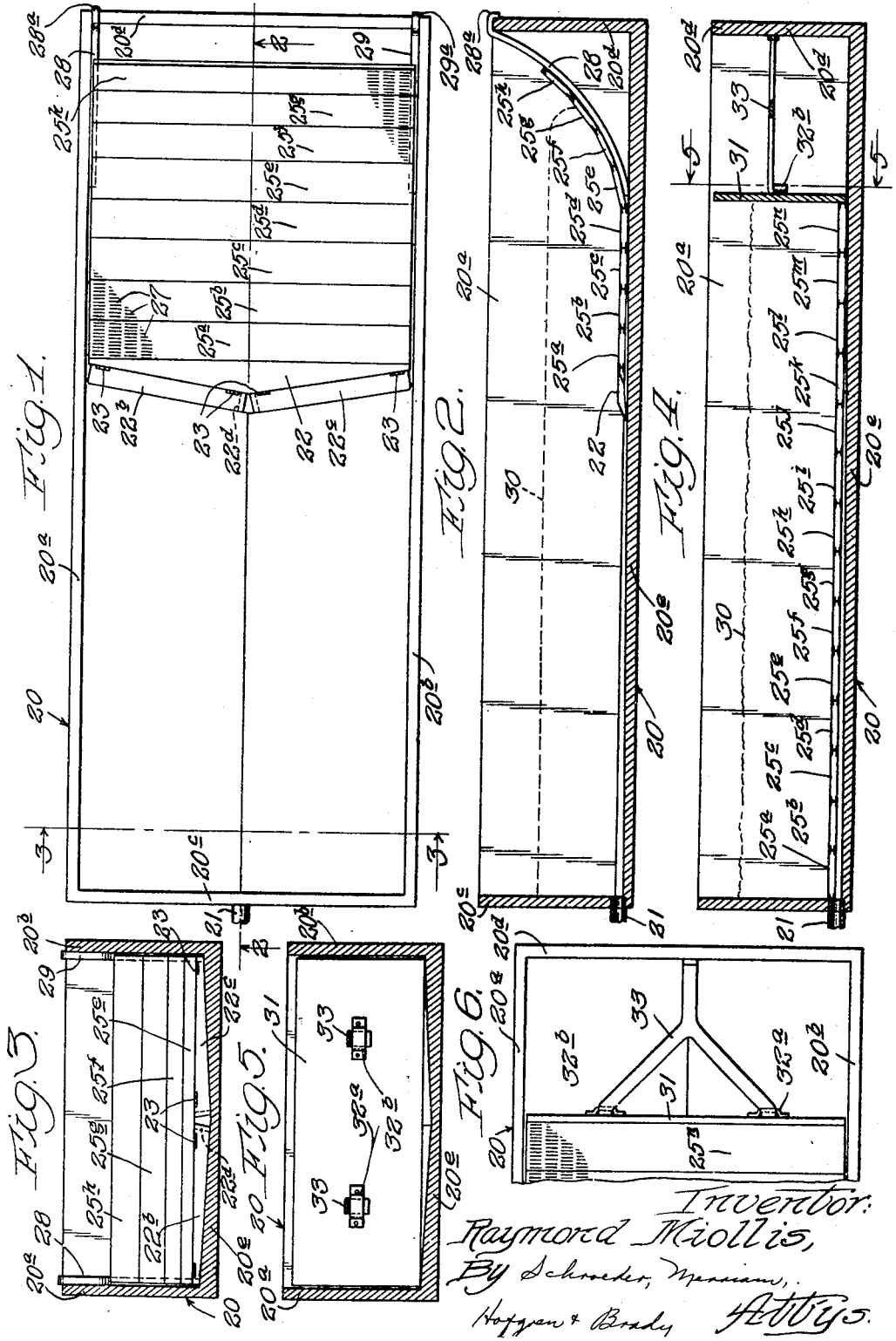
Inventor:
Raymond Miollis,
By Schroeder, Merriam,
Hofgren & Brady
Attys.

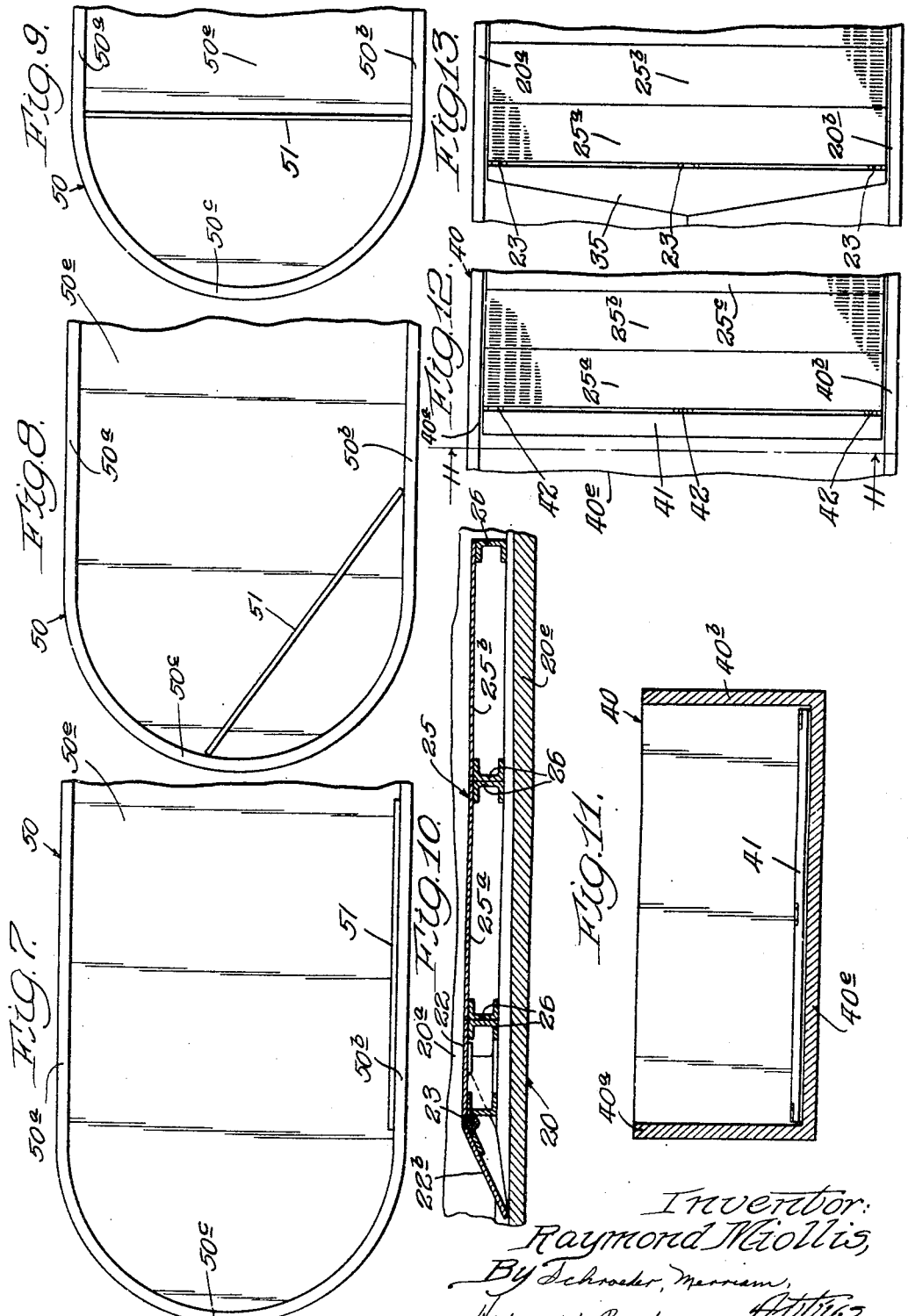

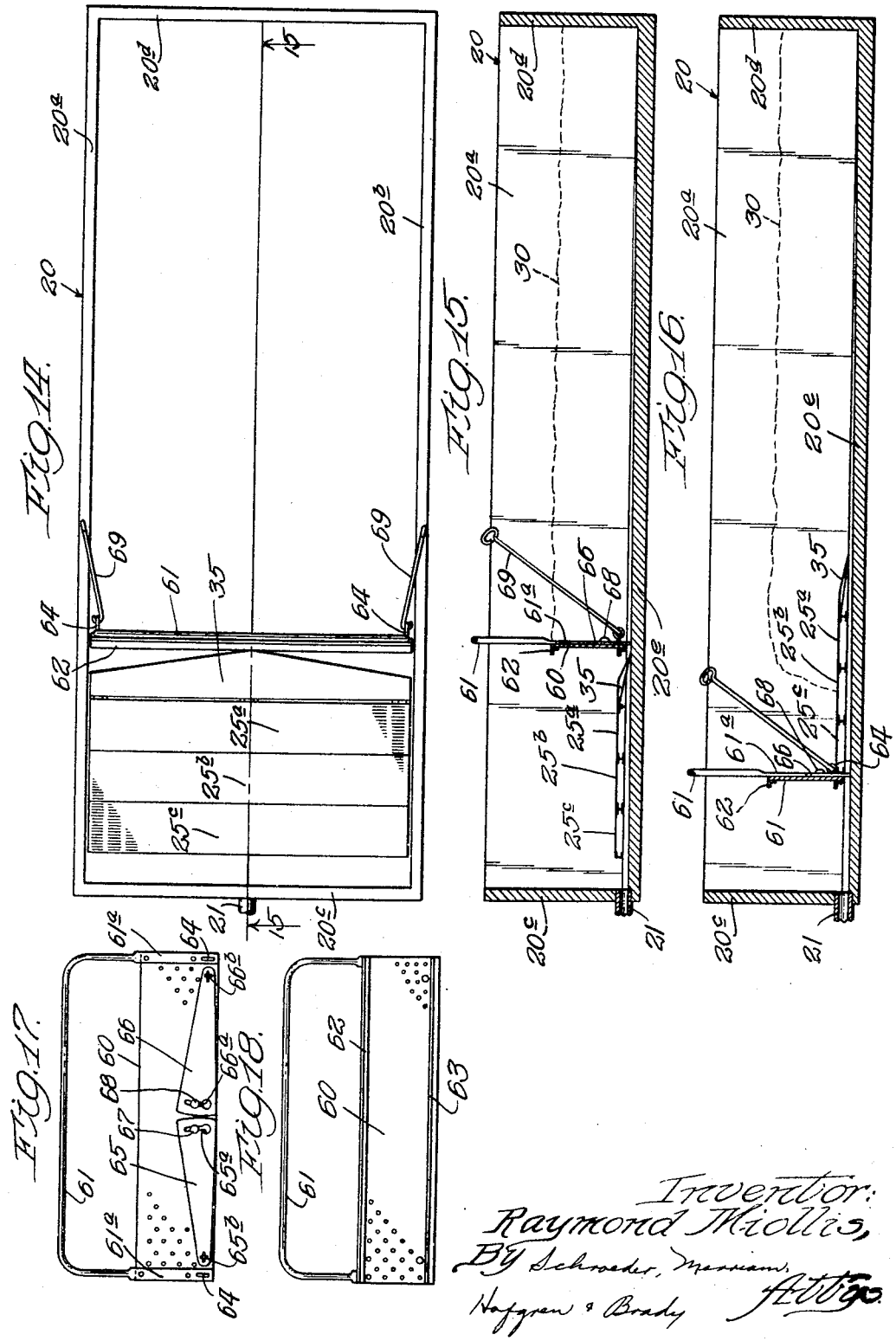

Patented Nov. 3, 1953

2,657,994

UNITED STATES PATENT OFFICE 2,657,994

CHEESE MAKING METHOD

Raymond Miollis, Maywood, Ill., assignor to The Borden Company, a corporation of New Jersey Original application March 19, 1949, Serial No. 82,459. Divided and this application July 5, 1951, Serial No. 235,320

5 Claims. (Cl. 99—116)

This invention relates to cheese making methods and more particularly to improved methods especially adapted for use in small cheese factories.

This application is a divisional of my application Serial No. 82,459, filed March 19, 1949.

One feature of this invention is that it provides improved methods for making cheese without utilizing special vats heretofore necessary; another feature of this invention is that it enables the milk to be coagulated and the curd to be drained and matted in a single vat without transfer; yet a further feature is that my method may be used in vats now conventionally found in small cheese plants; another feature of the invention is that it uses a movable platform adapted to be moved along the bottom of a vat containing curds to cause the curds to slide onto the surface of the platform; still another feature of the invention is that it utilizes a scraper member adapted to abut the platform at one edge and having a surface extending from the level of the platform surface to adjacent the bottom of the vat at an acute angle to the bottom of the vat to facilitate the movement of the curds on to the platform; yet other features of the invention are the use of a vertically disposed end plate for preventing curds from falling off the platform, and means for guiding the scraper and platform members to the bottom of the vat.

Other features and advantages will be apparent from the following description and from the drawings in which:

Fig. 1 is a plan view of a vat having the portion of the improved apparatus therein;

Fig. 2 is a vertical longitudinal section taken along the line 2—2 of Fig. 1;

Fig. 3 is a vertical transverse section taken along the line 3—3 of Fig. 1;

Fig. 4 is a vertical longitudinal section similar to Fig. 2, but showing the apparatus at a later point in the process of making cheese;

Fig. 5 is a vertical transverse section taken along the line 5—5 of Fig. 4;

Fig. 6 is a fragmentary plan view of the right end of the apparatus of Fig. 4;

Fig. 7 is a fragmentary plan view of a round ended vat having another portion of the apparatus therein;

Fig. 8 is a fragmentary plan view similar to Fig. 7, but showing the apparatus in a different position;

Fig. 9 is a fragmentary plan view similar to Figs. 7 and 8 but showing the apparatus in still a different position;

Fig. 10 is an enlarged fragmentary vertical section of a portion of the apparatus of Fig. 2;

Fig. 11 is a transverse vertical section through a flat bottomed vat having the improved apparatus therein, taken along the line 11—11 of Fig. 12;

Fig. 12 is a fragmentary plan view of a flat bottomed vat having one form of the apparatus therein;

Fig. 13 is a fragmentary plan view of a semi-V bottomed vat having another form of the apparatus therein;

Fig. 14 is a plan view of a vat having a modified end plate therein and showing a modified step in the method;

Fig. 15 is a vertical longitudinal section taken on the line 15—15 of Fig. 14;

Fig. 16 is a vertical longitudinal section showing the parts in a different position;

Fig. 17 is a front elevational view of the end plate of Fig. 14, looking from the right in Fig. 14; and Fig. 18 is a rear elevational view of said end plate.

In the past it was the practice in performing the operations necessary in making certain kinds of cheese, to utilize a plurality of vats including a cheese vat for forming the curds and a molding vat for pressing the curds and cutting them into cheese blocks. Very often a washing vat for brine or other material is also utilized intermediate the cheese vat and the molding vat. Transferring the curds into various vats after certain operations are performed in the cheese vat wherein the curds are formed has been advantageous because without apparatus of the type disclosed herein the cheese vat does not lend itself to efficient performance of the various steps required in making certain types of cheese, particularly where it is necessary to press the curds while they are immersed in liquid and simultaneously to permit the liquid to drain from the curds as taught in certain of my earlier patents.

Examples of cheese making methods and apparatus utilizing a plurality of vats (including a molding vat) for the efficient performance of the necessary steps are fully disclosed in my Patents 2,103,545, issued December 28, 1937, and Re. 21,834, reissued June 17, 1941, and since much of the apparatus utilized in making cheese in accordance with the present invention is disclosed in these patents, the disclosure herein will be kept brief and reference may be had to the above noted patents for a full and complete disclosure of apparatus and of method steps utilized in the complete cheese making operation.

I have found that while the apparatus and methods disclosed in the above mentioned patents are far superior to apparatus and methods heretofore employed, they do not readily lend themselves for use in small cheese factories which may not have space for a molding vat. The present invention comprises a modification and adaptation of certain of the apparatus and processes disclosed in the earlier patents above mentioned to a small cheese factory which may have only a single vat, and by means of the present invention all of the advantages set forth in the earlier patents above mentioned are retained without the necessity of utilizing a plurality of vats.

Referring now more particularly to the drawings, a vat is designated at 20. This vat may be of conventional construction and reference is had to Patent No. 2,103,545 for a detailed disclosure of the construction of the vat. Briefly, the vat has side walls 20a and 20b, end walls 20c and 20d and a bottom 20e. In the vat illustrated in Figs. 1-6 the bottom is of the semi-V type as shown best in Figs. 3 and 5 and is pitched from a high end shown at the right of Figs. 1, 2 and 4 toward a low end shown at the left of said figures. In America most cheese vats wherein the curds are formed are of this construction, the semi-V portion generally having a depth at the high end of the order of one-half inch and at the low end of the order of two and one-half inches, although vats having a total pitch greater than this are not uncommon. While in the drawings the vat illustrated is assumed to be a cheese vat wherein the curds are formed, it will be understood that the invention is equally applicable to other vats containing curds wherein one or more steps in the cheese making process have already been performed, as for example, in a washing vat wherein the curds have been washed in brine or some other suitable solution after being transferred from the cheese vat wherein the curds were formed. At its low end the vat 20 is provided with a gate leading to a drain pipe 21. Reference may be had to Patent No. 2,103,545 for a full disclosure of a similar gate structure.

The vat illustrated in Fig. 1 is generally designed to hold a quantity of milk and this milk in the vat is treated bacteriologically in the usual manner as more fully disclosed in my earlier patents so that curds and whey are formed. In order to form blocks of the particular type of cheese under consideration the curds must be pressed while they are immersed in liquid in order to avoid the formation of air pockets, and after pressing the mass of curd may be cut into cheese blocks and removed from the vat for curing and other treatment. Inasmuch as the pressing operation should separate the whey from the curds, the earlier mentioned patents teach removing the curds from the vat into a molding vat having a perforated false bottom facilitating drainage of the whey during the pressing operation. However, this method is inefficient and results in excessive labor, while there is often not space for molding vats in small factories. According to the present invention, a scraper member and a platform spaced above the bottom of the vat are provided and these members are moved under the mass of curd in order to permit drainage when the curds are pressed.

One form of scraper member preferably used in semi-V bottomed, longitudinally pitched vats as shown in Fig. 1, is illustrated in Figs. 1 and 3. In these figures the scraper comprises a portion 22 having its leading edges formed into a V and having a surface extending at an acute angle from adjacent the bottom of the vat. This surface is formed by a pair of flaps 22b and 22c hingedly mounted on the arms of the V by hinges 23, and a center flap 22d hingedly mounted adjacent the apex of the arms of the V. Together the flaps 22b, 22c, and 22d form a surface angular to the bottom of the vat, and the hinged mounting permits these members to follow the varying pitch of the vat as the scraper member is moved along the bottom of the vat.

A movable platform designated generally at 25 is provided having a surface spaced above the bottom of the vat. While this platform may be formed from a single member preferably it is formed of a plurality of rectangular platform members 25a—25n. Each platform member is as long as the inside width of the vat and each has spacing flanges engaging the bottom of the vat. Referring for a moment to Fig. 10, these spacing flanges may be in the form of channel irons 26 extending the entire length of the front and back sides of the rectangular members and being welded or otherwise secured thereto. Preferably each platform member is of a width convenient for handling, as about eight or nine inches in the apparatus shown. Each platform member 25a—25n has a plurality of drainage openings 27 therethrough as shown in Fig. 1, and the platform members may be similar to the trays disclosed in Patent Re. 21,834, being formed of sheet metal with a perforated surface.

Means are provided for guiding the scraper member and the platform members to the bottom of the vat, these means comprising a pair of rails 28 and 29 adapted to be movably supported in the vat. Each rail has a flanged portion as shown at 28a in Fig. 2, and each rail has an arcuate guiding portion extending from adjacent the bottom of the vat to above the level of the curds in the vat as shown in Fig. 2, the curd level being designated by the broken line 30 in this figure.

In making cheese, regardless of whether the curds are in the cheese vat wherein they were formed, or whether the curds have been removed to a washing vat wherein they are immersed in brine, the liquid in the vat (the whey or the brine) is agitated in the conventional manner. When it is desired to press the curds agitation is stopped and the curds are then removed from a space at one end of the vat (preferably the low end as illustrated in Figs. 14–16, although it may be done from the other end as illustrated in Figs. 1 and 2) and the scraper member 22 and one or more platform members 25 are placed in this curd free space, the guide rails 26 and 27 being utilized if desired, as shown in Figs. 1 and 2. The scraper member and the platform members are then pushed toward the other end of the vat, additional platform members being added at the end of the train as required. During this operation the curd is preferably continuously stirred by an operator with a curd rake so that the curd is kept in suspension and the progress of the scraper member and platform is facilitated.

When the train comprising the scraper 22 and the platform members 25 has been advanced until the scraper hits the other end of the vat the scraper may be removed from its hinges and a final push will bring the first platform member 25a into contact with the end of the vat as shown in Fig. 4. If desired, instead of removing the scraper it may be turned on its hinges to a vertical position. An end plate 31 may be placed abutting the last platform member 25n as shown in Figs. 4 and 6. While other means may be utilized for holding the end plate in a vertical position, as for example hooks or stops anchored on the side walls of the vat, the end plate is preferably provided with brackets 32a and 32b, which engage the downwardly turned ends of the arms of a Y-shaped rake handle 33. The end plate may have one or more drainage openings if desired.

Any curds which may have been left at the end of the vat between the end plate and the end wall 20d may be picked up with a perforated scoop and deposited on the batch of curds 30. Inasmuch as the surface of the platform 25 is spaced above the bottom of the vat (a spacing of about one to two or two and a half inches is preferred) the whey drains readily from the curds into the bottom of the vat during the pressing operation. This pressing operation is fully described in the patents above referred to and will not be repeated here except to say that pressure plates may be placed on top of the curd batch and left there for a period of ten to thirty minutes. Because of the longitudinal pitch in the vat bottom the whey will drain to the pipe 21. After the curds are pressed the surface of the curd mass may be marked transversely of the vat to indicate the desired size of the cheese blocks which are to be cut, and the curds may then be cut along these lines and each block may be removed on its supporting platform member. An apparatus and method for cutting the cheese blocks is fully disclosed in the earlier mentioned patents.

Fig. 13 shows a modified form of scraper member. In Fig. 13 a scraper member 35 has its leading edge formed as a shallow V and is hingedly mounted as shown at 23 to the leading platform member 25a. No flaps are provided on the scraper member. This form of scraper is particularly adapted for use in a vat which does not have any longitudinal pitch, although if the pitch is not too great, it can be used efficiently in a vat as shown in Figs. 1-5.

Figs. 11 and 12 show another form of scraper member designed for use in a flat bottomed vat. This vat, designated generally at 40 and shown only fragmentarily in Figs. 11 and 12, has side walls 40a and 40b and a flat bottom 40e. Of course, if desired, this flat bottom may have a longitudinal pitch to facilitate drainage. For use in a vat of this type (which is only seldom found in America, but is commonly used in Europe) the leading edge of the scraper member 41 should be straight as shown in Fig. 12, and the scraper member may comprise a rectangular sheet member adapted to be hingedly mounted on the leading platform member 25a by means of hinges 42.

Figs. 7, 8 and 9 show apparatus for use in a round ended vat, such a vat being designated in these figures generally at 50 and comprising parallel side walls 50a and 50b, a bottom 50e which may be flat or in the form of a semi-V, and end walls at least one of which is rounded as shown at 50c. If the train comprising the scraper and the platform is to be advanced toward the rounded end obviously the curds in the rounded end would not be moved on to the surface of the platform. Consequently, I provide an additional end plate 51. This plate is as long as the internal width of the vat and high enough to extend above the surface of the curds in the vat. The plate may or may not be perforated as desired. Before the scraper member and the platform are moved toward the hinged end of the vat the end plate 51 is inserted along one side of the vat as shown in Fig. 7. The end plate is then moved around the rounded end of the vat as shown in Fig. 8, opposite ends of the end plate always being in engagement with the walls of the vat. During this movement the end plate pushes before it the curds in the rounded end of the vat and when the end plate reaches the position of Fig. 9 where it extends transversely across the vat the rounded end will be substantially free of curds. Any curds remaining may be scooped up and thrown over the end plate. Any desired means of supporting the end plate in the position of Fig. 9 may be utilized, and when the scraper member strikes the end plate the same procedure as earlier described may be folowed.

A different means for removing curds to permit the insertion of the scraper and the platform in the vat is shown in Figs. 14-18. In these figures a special end plate may be provided comprising a plate member 60 having a handle 61. As shown in Figs. 17 and 18 the plate 60 may be a perforated stainless steel sheet and the handle may comprise a bar formed in the shape of a U and having its ends flattened at 61a and riveted or otherwise secured to the sheet 60 to strengthen the sheet. On the other side of the sheet angle irons 62 and 63 are secured along the respective top and bottom edges of the sheet 60 for additional strength. An eyebolt 64 is mounted adjacent each lower corner of the end plate.

Since an end plate of this type is particularly useful in a vat having a semi-V bottom a pair of segments 65 and 66 are movably mounted on the face of the sheet member 60. Referring to Fig. 17 it may be seen that each segment is generally triangular in form with its apex pivotally secured to the sheet 60 adjacent a lower corner of said sheet by means of buttons 65b and 66c which permit easy removal of the segments for cleaning. The member 65 has a slot 65a adjacent its base and extending generally parallel therewith, and the member 66 has a similar slot 66a. The slot 65a engages a stud 67 extending from the face of member 60 and the slot 66a engages a similar stud 68. Preferably the studs have a shank and enlarged head and the slots are of keyhole shape so that the stud cannot come out of the slot except when the segment is raised to bring the head of the stud adjacent the enlarged lower end of the slot.

When used in a semi-V bottomed vat the segments pivot at their mounting points 65b and 66b to follow the contour of the bottom of the vat. The pivotal mounting of the segments may be off center to allow the segments properly to sweep the vat bottom and the arrangement is such that when the segments have pivoted downwardly to the limit allowed by the slots and studs the lower inner corner of each segment will be about three inches below the bottom of the sheet member 60.

In Figs. 14, 15 and 16 the modified apparatus is shown in use in the semi-V bottomed vat 20. Instead of using a rake to remove curds from the end of the vat the end plate 60 is slid down to the bottom of the vat along one of the end walls, the apparatus being inserted in the low end of the vat in the drawings. The end plate may then be grasped at each end, two operators being employed. Each operator inserts the hooked end of a rod 69 into one of the eyebolts 64 at a lower corner of the end plate, and each operator grabs the handle 61 with his other hand. The operators then pull the end plate toward the high end of the vat, moving the curds ahead of the plate. When enough room is provided a scraper 35 and one or more platform members 25 are inserted behind the end plate as shown in Figs. 14 and 15. The end plate may then be moved to a position behind the last platform members as shown in Fig. 16 and the operators may pull the train comprising the scraper member and the end plates toward the high end of the vat. At intervals the end plate may be moved and additional platform members inserted until the whole train is under the mass of curds, at which time the hooks 69 may be removed and the end plate supported in the manner shown in Fig. 6 or in any other suitable manner. The curds are then pressed and cheese blocks cut therefrom in the same manner as heretofore disclosed.

While I have shown and described certain embodiments of my invention, it is to be understood that it is capable of many modifications, and changes in the construction and arrangement may be made without departing from the spirit and scope of the invention as disclosed in the appended claims.

I claim:

1. In a method of making cheese in a vat, the steps comprising: removing the curds from a space adjacent one end of said vat; elevating the curds above the bottom of the vat by bringing a scraper member against the curds in said space, bringing at least one platform member into said space adjacent said scraper member but closer to said end and moving said scraper member and platform member toward the other end of said vat to cause the curds to slide up across the surface of said scraper member onto said platform; and draining the whey into the space therebelow.

2. In a method of making cheese in a vat, the steps comprising: removing the curds from a space adjacent one end of said vat; elevating the curds above the bottom of the vat by bringing a scraper member against the curds in said space, bringing at least one platform member into said space adjacent said scraper member but closer to said end, moving said scraper member and platform members toward the other end of said vat and alternately placing similar platform members in said space and moving said scraper member and platform members toward the other end of said vat to cause the curds to slide up across the surface of said scraper member onto said platform; and draining the whey into the space therebelow.

3. In a method of making cheese in a vat, the steps comprising: removing the curds from a space adjacent one end of said vat; elevating the curds above the bottom of the vat by bringing a scraper member against the curds in said space, bringing at least one platform member into said space adjacent said scraper member but closer to said end, moving said scraper member and platform members toward the other end of said vat, alternately placing similar platform members in such space and moving said scraper member and platform members toward the other end of said vat to cause the curds to slide up across the surface of said scraper member and placing an end plate in abutment with the end platform member for preventing curds from falling off said platform; and draining the whey into the space therebelow.

4. In a method of making cheese in a round ended vat wherein curds are formed, the steps comprising: removing the curds from one end of the vat by placing a plate in said vat along one side thereof adjacent the rounded end and moving said plate to a position transverse of said vat; removing the curds from a space adjacent the other end of said vat; elevating the curds above the bottom of the vat by bringing a scraper member against the curds in said space, bringing at least one platform member into said space adjacent said scraper member but closer to said other end, moving said scraper member and platform member toward the rounded end of said vat, alternately bringing similar platform members in said space and moving said scraper member and platform members toward the rounded end of said vat, to cause the curds to slide up across the surface of said scraper member onto said platform; and draining the whey into the space therebelow.

5. In a method of making cheese in a vat, the steps comprising: coagulating the milk to form cheese curds; elevating the curds above the bottom of the vat by inserting a scraper member under the curds near one end of the vat and inserting a platform member behind said scraper member and moving them along the bottom of said vat to position said platform member beneath said curds; and draining the whey into the space therebelow.

RAYMOND MIOLLIS.

References Cited in the file of this patent

UNITED STATES PATENTS

| Number | Name | Date |
| --- | --- | --- |
| Re. 21,834 | Miollis | June 17, 1941 |
| 2,193,462 | Miollis | Mar. 12, 1940 |
| 2,324,636 | Miollis | July 20, 1943 |